Aug. 4, 1959
R. KLOSS
2,897,801
INTERNAL COMBUSTION ENGINE
Filed April 14, 1958
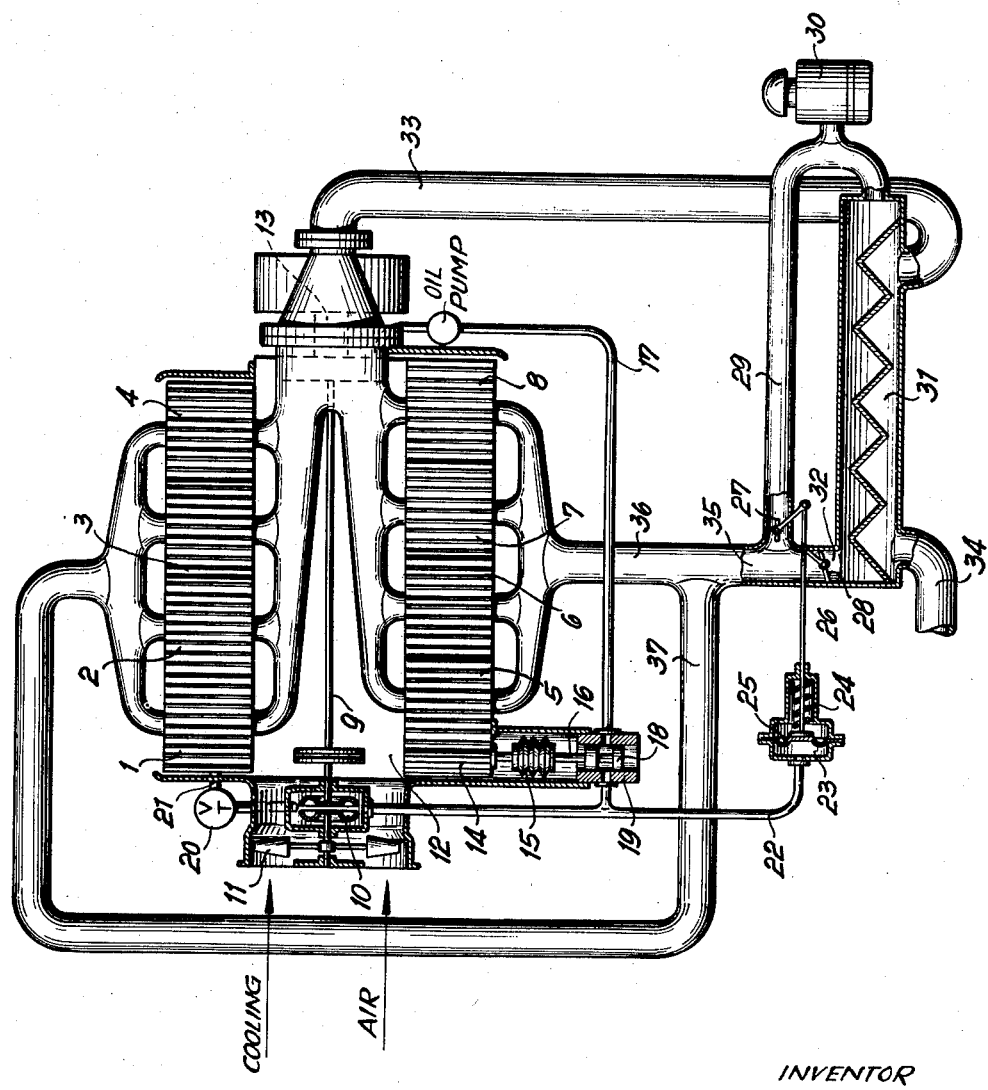
INVENTOR
Richard Kloss
By
Patent Agent

United States Patent Office 2,897,801
Patented Aug. 4, 1959

2,897,801

INTERNAL COMBUSTION ENGINE

Richard Kloss, Koln-Buchforst, Germany, assignor to Klockner-Humboldt-Deutz Aktiengesellschaft, Koln, Germany Application April 14, 1958, Serial No. 728,185

Claims priority, application Germany April 20, 1957

3 Claims. (Cl. 123—41.12)

The present invention relates to an internal combustion engine, particularly for vehicles, with a relatively wide speed range and a relatively large load range. The present invention is particularly directed to an internal combustion engine in which for purposes of maintaining a certain favorable engine temperature, the supply of cooling means is controlled by a thermostat responsive to changes in the engine temperature.

With internal combustion piston engines, especially with multi-fuel engines adapted to be operated by fuels of rather varying ignition qualities, for the purpose of obtaining a certain reliable ignition and an engine temperature which will insure a smooth running of the engine over the entire speed range and load range of the engine, it is advisable to control not only the supply of cooling means but also the temperature of the combustion air conveyed into the engine cylinders.

Heretofore it was customary to control the supply of cooling means separately from the control of the temperature of the combustion air. This required the arrangement of a plurality of thermostats and made the system more complicated.

It is, therefore, an object of the present invention to provide an arrangement which will overcome the above mentioned drawback.

It is another object of this invention to provide an arrangement in connection with internal combustion engines of wide speed range and high load range, in which the supply of cooling means and the temperature of the combustion air will be controlled by a single thermostat.

These and other objects and advantages of the invention will appear more clearly from the following specification in connection with the accompanying drawing showing a top view of an eight-cylinder air cooled internal combustion engine according to the present invention.

General arrangement

The above mentioned objects have been materialized according to the present invention by the employment of a single thermostat in such a way that the combustion air below the desired favorable engine temperature will enter the cylinders at a higher temperature than will be the case when the combustion air has a temperature above the desired engine temperature. This control may be effected in any convenient manner. Air cooled internal combustion piston engines with a cooling blower adapted to be driven through the intervention of a hydrodynamic slip coupling with control of the filling may for instance, in conformity with the present invention, be so designed that the thermostat controlling the engine temperature controls the filling of the blower clutch and that the filling conduit which is in continuous communication with the coupling communicates with the working chamber of a spring-loaded piston which latter is adapted when in its starting position to allow preheated combustion air to pass into the cylinders. With increasing pressure in the filling conduit of the coupling, the spring-loaded piston is moved into a position in which it allows combustion air of decreased temperature only to pass into the cylinders.

Structural arrangement

Referring now to the drawing in detail, the cylinders of the eight-cylinder air cooled internal combustion engine shown therein are sub-divided in two groups of four cylinders each namely the cylinders 1–4 of the first group and the cylinders 5–8 of the second group. The cylinders of each group are arranged one behind the other. Both groups are arranged at an angle to each other in V-formation. The cooling air passes in the direction indicated by the arrows to an axial blower 11 which is arranged at the front end of the engine and is driven by the engine through a shaft 9 and a hydraulic coupling 10. The blower 11 conveys the air into the V-shaped chamber 12 between the two cylinder rows, and from there the air passes to the cooling zones of the engine. The drive shaft 9 for the blower 11 extends substantially parallel to the crank shaft 13 through the V-chamber 12. A cooler 14 for recooling the lubricating oil is arranged adjacent to the cylinder 5. When looking in the direction of flow of the cooling air, a thermostat 15 is arranged behind the cylinder 5 and the oil cooler 14 in the flowing off heated cooling air. The thermostat 15 is adapted through the intervention of a connecting rod 16 to actuate a valve spool 18 which controls the oil under pressure flowing from conduit 17 to the hydraulic coupling 10. The valve spool is reciprocable in a cylindrical valve casing 19. Thermostat 15 controls the speed of the blower 11 so as to maintain a favorable engine temperature over the entire load range.

The hydraulic fluid coupling 10 has a discharge conduit 21 controlled by a throttle 20 for the filling means and has a slip which decreases with the increase in excessively delivered filling means over the filling means flowing off through the throttled conduit 21. In other words, the hydraulic fluid coupling 10 is adapted to convey a torque which increases with the excess of the delivered filling means over that flowing off through the throttled conduit 21.

From conduit 17 behind the valve 18, 19, a conduit 22 branches off which communicates with the working chamber 23 of a diaphragm 25 which is under the load of a spring 24. The diaphragm 25 is adapted through the intervention of a rod 26 to actuate two throttles 27 and 28. The throttle 27 is arranged in a conduit 29, through which air having a temperature of the surrounding is drawn in by the engine through a filter 30 when the throttle 27 is in open position. The throttle 28 is arranged in the discharge connection 32 of a heat exchanger 31 in which, when the throttle 28 is open, combustion air drawn in through the filter 30 is heated up by the exhaust gases of the engine. The exhaust gases are conveyed to the heat exchanger 31 through a collecting conduit 33. The said exhaust gases leave the heat exchanger 31 through a conduit 34.

The throttles 27 and 28 are so linked to the rod 26 actuated by the diaphragm 25 that with increasing pressure in conduit 22, the throttle 27 moves into its opening position whereas the throttle 28 moves into its closing position. The conduit 29 and the connection 32 of the heat exchanger 31 communicate with an intake collecting conduit 35 which in its turn subdivides into two branches 36 and 37 leading to the two cylinder groups of the engine.

Operation

When the thermostat 15 through control valve 18, 19 blocks the delivery of filling means to the hydraulic coupling 10, because the temperature of the cooling air flowing off is less than the temperature to which the thermostat has been adjusted, the rotational speed of the blower 11 drops, and the diaphragm 25 due to the pressure of spring 24 moves into a position in which the throttle 28 is opened while the throttle 27 is closed. The combustion air drawn in by the engine will thus be preheated. The decreased cooling of the cylinders and the heating up of the combustion air will bring about an increase in the temperature of the cylinders. If during this increase in temperature, the temperature of the warmed-up cooling air which surrounds the thermostat exceeds the temperature to which the thermostat 15 has been adjusted, the said thermostat again establishes communication to the slip coupling so that the latter will again receive filling means. As a result thereof, an increased supply of cooling air and a movement of the diaphragm 25 toward the right will occur. With this diaphragm movement, the throttle 28 moves into its closing position whereas the throttle 27 moves into its open position. Thus, the engine will now not only be cooled to a greater extent but will also not draw in preheated air. When the cylinder temperature will drop again due to a decrease in the load or the rotational speed, the cycle will start anew.

It is, of course, to be understood that the present invention is, by no means, limited to the particular construction shown in the drawing but also comprises any modifications within the scope of the appended claims.

What I claim is:

1. A method of maintaining the temperature of the cylinders of an internal combustion engine within a certain favorable temperature range, which includes the steps of: varying the supply of cooling means for said cylinders in conformity with the temperature of said cylinders, and varying the temperature of the combustion air for said cylinders in such a way that at a cylinder temperature below said certain favorable temperature range the combustion air for said cylinders when entering the same will have a temperature higher than the temperature of the combustion air entering said cylinders when the cylinder temperature is above said certain favorable temperature range.

2. In combination with an internal combustion engine: a cooling device for supplying cooling means to said engine; slip clutch means for drivingly connecting said cooling device to said engine, said clutch means being variable as to its slip; air intake means arranged for conveying combustion air to said engine, said air intake means comprising a main line for primarily conveying non-preheated air to said engine and also comprising a branch line with heating means associated therewith for conveying pre-heated air to said engine; first throttle means arranged in said main line and movable from a reduced passage position, in which the passage of air through said main line to said engine is reduced over the maximum possible passage of air through said main line to said engine, into an increased passage position for conveying an increased quantity of air through said main line to said engine, and vice versa; second throttle means arranged in said branch line and movable from a reduced passage position, in which the passage of preheated air through said branch line to said engine is reduced over the maximum possible passage of preheated air through said branch line to said engine, into an increased passage position for conveying an increased quantity of preheated air through said branch line to said engine, and vice versa; said first and second throttle means being interconnected in such a way that when said first throttle means is in increased passage position said second throttle means will be in reduced passage position, and vice versa; temperature responsive means movable in a first direction in response to the temperature of said engine dropping below a certain temperature range to bring about an increase in the slip of said clutch means, said temperature responsive means also being movable in a second direction in response to the engine temperature increasing above said certain temperature range to decrease the slip of said clutch means; and control means operatively connected to said first and second throttle means and operable in response to the movement of said temperature responsive means in said first direction for moving said first throttle means into reduced passage position and said second throttle means into increased passage position, said control means also being adapted in response to said temperature responsive means moving in said second direction to move said first throttle means into increased passage position and to move said second throttle means into reduced passage position.

3. In combination with an internal combustion engine: blower means for delivering cooling air to said engine, a hydrodynamic slip clutch with filling control arranged for drivingly connecting said blower means to said engine, first pressure fluid conveying means for conveying pressure fluid to said slip clutch, valve means arranged in said first pressure fluid conveying means and movable in a first direction for bringing about an increased supply of pressure fluid to said clutch, said valve means also being movable in a second direction for reducing the supply of pressure fluid to said clutch to thereby increase the slip of said clutch, thermostat means arranged adjacent said engine and operatively connected to said valve means for controlling the same, said thermostat means being operable in response to the temperature of said engine dropping below a certain temperature range to move said valve means in said first direction, said thermostat means also being operable in response to the temperature of said engine increasing above said certain temperature range to move said valve means in said second direction, air intake means arranged for conveying combustion air to said engine, said air intake means comprising a main line for conveying primarily non-preheated air to said engine and also comprising a branch line with heating means associated therewith for conveying preheated air to said engine; first throttle means arranged in said main line and movable from a reduced passage position, in which the passage of air through said main line to said engine is reduced over the maximum possible passage of air through said main line to said engine, into an increased passage position for conveying an increased quantity of air through said main line to said engine, and vice versa; second throttle means arranged in said branch line and movable from a reduced passage position, in which the passage of preheated air through said branch line to said engine is reduced over the maximum possible passage of preheated air through said branch line to said engine, into an increased passage position for conveying an increased quantity of preheated air through said branch line to said engine, and vice versa; said first and second throttle means being interconnected in such a way that when said first throttle means is in increased passage position said second throttle means will be in reduced passage position, and vice versa; piston means operatively connected to said two throttle means for actuating the same, spring means continuously urging said piston means to move said first throttle means into increased passage position and to move said second throttle means into reduced passage position, and second pressure fluid conveying means communicating with said first pressure fluid conveying means at a point intermediate said clutch and said valve means and leading to said piston means for conveying fluid pressure thereto in response to said valve means moving in said first direction to thereby move said piston means against the thrust of said spring means when the fluid pressure acting upon said piston means exceeds the thrust of said spring means.

No references cited.